United States Patent [19]
Bronaugh et al.

[11] Patent Number: 5,621,502
[45] Date of Patent: Apr. 15, 1997

[54] MOSAIC FABRICATION FIXTURE AND METHOD OF MAKING MOSAICS

[75] Inventors: William R. Bronaugh, Garden Grove; Hans J. Dehli, Dana Point, both of Calif.

[73] Assignee: Admotion Corporation, Irvine, Calif.

[21] Appl. No.: 428,701

[22] Filed: Apr. 25, 1995

[51] Int. Cl.$^6$ .............................. G03B 27/02; G03B 27/52
[52] U.S. Cl. ............................... 355/79; 355/40; 355/72; 355/77
[58] Field of Search ........................... 40/361, 362, 363, 40/364, 365–367; 355/72, 77, 79, 40

[56] References Cited

U.S. PATENT DOCUMENTS

| | | |
|---|---|---|
| 1,413,406 | 4/1922 | Huebner . |
| 2,605,675 | 8/1952 | Mourfield . |
| 2,763,182 | 9/1956 | Urban et al. . |
| 3,082,560 | 3/1963 | Elvestrom . |
| 3,314,179 | 4/1967 | Leach . |
| 3,635,560 | 1/1972 | Hulen . |
| 3,684,370 | 8/1972 | Yin . |
| 3,742,631 | 7/1973 | Hasala . |
| 3,862,504 | 1/1975 | Ringelheim et al. . |
| 3,918,185 | 11/1975 | Hasala . |
| 3,927,942 | 12/1975 | Byers . |
| 4,105,328 | 8/1978 | Wasson et al. . |
| 4,118,879 | 10/1978 | Simon . |
| 4,142,794 | 3/1979 | Trump . |
| 4,358,198 | 11/1982 | Moriyama et al. . |
| 4,864,361 | 9/1989 | Amao et al. . |
| 4,897,802 | 1/1990 | Arkinson et al. . |

Primary Examiner—Arthur T. Grimley
Assistant Examiner—Herbert V. Kerner
Attorney, Agent, or Firm—Fulwider Patton Lee & Utecht, LLP; Vern Schooley

[57] ABSTRACT

An exposure system for creating a single frame transparency having an enlarger rack with a transparency fixture. The fixture includes an inner and outer frame which cooperate to allow incremental relative movement therebetween during an exposure process which results in a single transparency having four independent images, each of the images having spaced apart groups of pixels interlaced with the groups of pixels from each of the other images, each of the images being selectable for projection by a movable grid mask. A method for preparing four images from a single transparency is also disclosed. The transparency is formed by sequentially exposing portions of a sheet of film overlayed by a gridlike mask, and correspondingly repositioning the mask after each exposure such that a new interlaced area of film is exposed.

16 Claims, 6 Drawing Sheets

⊠ CIRCLE ⌸ DIAMOND ☰ SQUARE ⬡ HEXAGON

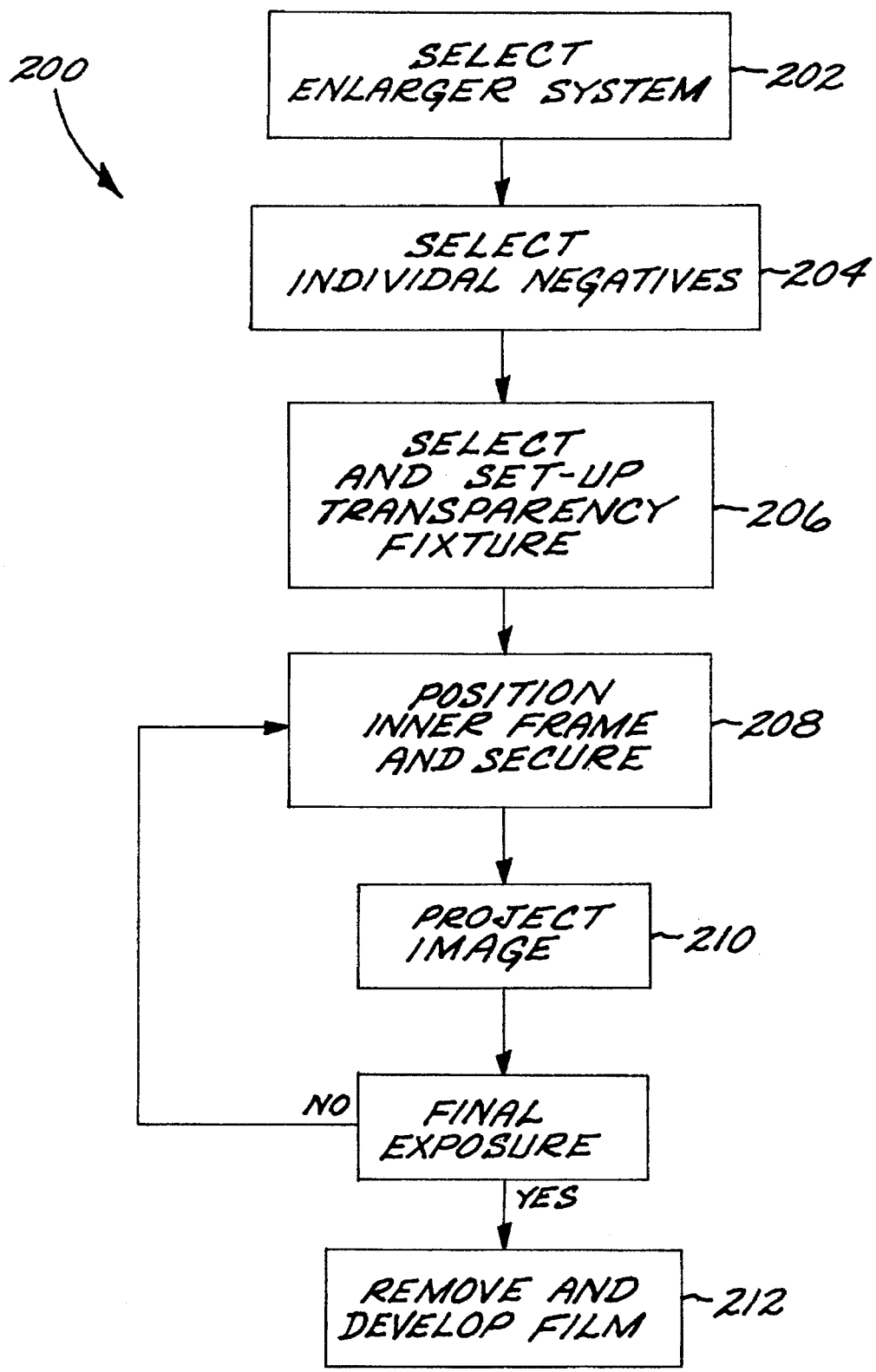

MOSAIC FABRICATION FIXTURE AND METHOD OF MAKING MOSAICS

BACKGROUND OF THE INVENTION

1. Field of the Invention

The present invention relates to advertising displays and more particularly to a fixture and method for creating mosaic transparencies used for sequentially exhibiting multiple images in an advertising display.

2. Description of the Prior Art

Advertising allows various business organizations to convey information concerning their products to consumers. Creating a market worth billions of dollars each year, advertising agencies continually seek new and innovative ways to "deliver their message" to consumers. Whether by billboard, bus, or blimp, consumers often react to these messages by purchasing the represented products. Thus, the need for product exposure is often critical to the success of a product.

Comprising a small but critical segment of the advertising industry is "point of sale" advertising where descriptive product exposure occurs near the product itself inside the store. Such exposure often involves colorful posters or sightly banners to attract attention. In addition, video displays are often used which may illustrate the uses or benefits of a product. However, due to limitations on the extent of space available to attract the attention of potential customers, only limited numbers of such banners and video representations can be displayed in a defined area. As a result, compact advertising devices have been proposed to sequentially display several different images for set periods of time on a single screen to provide advertisers with greater flexibility for a greater variety of exposure.

Utilizing attention grabbing animated displays and multiple display advertisements to improve communication of an advertiser's message, sequential image display systems take many forms. Display devices including templates with patterns of apertures which define numbers, letters or figures when they are illuminated by back lighting have been described. See, e.g., Hildburgh, U.S. Pat. No. 1,172,455, and Kass, U.S. Pat. No. 2,982,038. There have also been described display devices including transparency sheets which have images thereon to be illuminated by back lighting for projection through an overlay mask which selectively blocks the back lighting from illuminating certain areas of the transparency sheets. See, e.g., Elvestrom, U.S. Pat. No. 3,000,125, Fukui, U.S. Pat. No. 3,683,525, and Hasala, U.S. Pat. No. 3,742,631.

In addition, devices have been proposed which include a translucent image screen made up of a mosaic of discrete images formed by relatively small interlaced translucent pixels or window segments which are arranged in uniform groups. Pixels corresponding to a discrete image occupy the same relative position in each group and bear corresponding relative magnitudes of translucency. An opaque overlay screen having a uniform pattern of transparent display apertures may then cover the image screen. Providing a masking function, the opaque screen blocks back lighting from projecting through the image screen, except for the areas defined by the display apertures. The uniformly patterned display apertures are then aligned with pixels which correspond to a discrete image and the discrete image is thereby displayed due to the back light shining through the areas of the image screen defined by the display apertures. Selectively shifted on the image screen such that the display apertures align with the pixels of a different image, the opaque screen may be repositioned. Thus, each discrete image may be sequentially displayed.

A device of this general description is shown in U.S. Pat. No. 4,897,802 to Atkinson et al., assigned to the assignee of the present application. The device, as described in that patent, exhibits excellent operational characteristics, sequentially displaying discrete images exposed onto a single transparency.

The transparency used in the Atkinson display device is fabricated according to one of two methods by using a fixture disclosed in the Atkinson patent. The fixture is part of an exposure system, comprising a camera and a framework for mounting a projector. A mirrored, folded light path is provided through the framework for columnating the light to obtain full size pixels. This mirrored path is necessary to minimize divergence of the projected light from the light source, often causing shadowing and oversizing of exposed pixels due to the relatively small sizing of the mask apertures through which the projected light passes. The system further includes a mask and a moveable vacuum mount with film mounted thereon. Corresponding to the pixel spacing, the mount is moveable 0.013 inches right, left, up and down. Although beneficial in that the fixture offers a movable mount, enabling efficient repositioning of the film to allow all four exposures to be made onto the single sheet of film, the device is large and relatively complex due to the mirrored path.

Having fabrication fixtures structurally similar to the fixture disclosed in Atkinson, "step and repeat" exposure systems often allow multiple exposures from an original negative and generally include frameworks having film mounting portions along with hinged masked frames allowing light to expose only certain sections of film. Such devices are illustrated in U.S. Pat. Nos. 2,605,675 to Mourfield, 2,763,182 to Urban, 3,635,560 to Hulen, 3,684,370 to Yin and 3,927,942 to Byers. While these fixtures often provide for relative movement between the film and the mask, such movement is often for "registry" purposes to align a new section of unexposed film for exposure of an image to that particular section.

Step and repeat exposure methods are often used to quickly and efficiently expose duplicate images onto single sheets of film. Using a multiple image placement camera to expose individually spaced pictures, U.S. Pat. Nos. 2,763, 182, 3,635,560, and 2,605,675 illustrate the general "step and repeat" method. First, a particular negative is exposed onto an unmasked portion of film. Next, a special fixture precisely moves either the film or a mask to the corresponding location for the next image to be exposed. The process repeats as desired until the film is completely exposed. Although extremely efficient and adequate to expose multiple images onto single sheets of film, the disclosed methods do not create images which are interlaced among other images throughout the film surface for efficient display of selected ones of such images for set periods of time. Rather, each print is set onto its own particular section of film, often resulting in rows and columns of pictures.

In addition to teaching the basic display apparatus and mosaic fabrication fixture, the Atkinson patent further discloses methods of fabricating the mosaic image screens used with the display device. One such method begins by supplying an image bearing negative along with a full size sheet of film. Critical to the fabrication process, a fixture having an opaque stationary gridlike mask is provided to secure the film. The mask allows "segments" of the overall image to be exposed onto the film, while still preserving the overall image likeness. The exposure process begins by projecting the image onto the masked film thus producing a transparency with the image. Next, a new negative is supplied along with another sheet of film, and the process repeated. After four such exposures, the resulting transparencies are stacked with the exposed "groups" offset from one another to cooperate to form a mosaic. The mosaic is then photographically reproduced to generate a single transparency with the mosaic image.

A second method disclosed by the Atkinson patent simplifies the above procedure somewhat by making use of the mirrored path exposure fixture described previously. The method duplicates the steps of the first method except for the "stacking" operation of the resulting transparencies. Instead, the fixture is configured such that one sheet of film is affixed to a movable platen, and repositioned after each exposure so that all four images become exposed onto the same sheet during the initial exposure process.

Although beneficial for their intended purposes, the above mentioned mosaic fabrication methods have limitations which often compromise the quality of the finished product. One such limitation involves a phenomena commonly referred to as "white flash". Representing bright border streaks adjacent to opaque pixel boundary lines, "white flash" detracts from the quality of the image presentation during an image transition, causing attention to the bright aberrations momentarily observable on the display viewing surface. Careful exposure techniques using the hereinabove methods may result in a transparency free from "white flash", however, such techniques often involve exact alignment of new exposures or the exposure mask to prevent exposure voids between pixels. However, such time consuming care creates a more costly finished product.

Thus the need exists for a simple and efficient display mosaic fabrication fixture having the capability of controllably and precisely relatively positioning a mask relative to a sheet of film for creating a display mosaic image characterized by individual image pixels interspersed with pixels of other images over the face of the sheet of film for subsequent selected illumination of the selected pixels of the respective images. Additionally, the need exists for a more efficient method for creating mosaic transparencies free from "white flash".

SUMMARY OF THE INVENTION

The present invention is characterized by the preparation of a mosaic transparency of a uniform pattern of equivalently sized pixels defining window elements, such window elements being arranged in uniform groups, each group having respective window elements in corresponding locations therein. The window elements in corresponding locations in each group cooperate to define discrete patterns for video display.

The fixture used to create the mosaic transparencies described above generally includes a base with a central film support platen around which is mounted a raised outer frame. An inner frame is formed to complement the outer frame such that a small amount of relative movement between the two frames is possible. The inner frame includes a glass plate enclosed peripherally by a metallic border. Affixed to the glass plate is a gridlike mask having defined apertures for passing light therethrough. Precise positioners line the periphery of the outer frame to regulate the lateral movement of the inner frame within the platen.

During the exposure process, securing devices cooperate with both frames to inhibit movement therebetween.

The mosaic is fabricated by sequentially exposing images to the unexposed areas of film, as defined by the exposure mask. Subsequent to each exposure, the mask is repositioned a predetermined distance, then secured, unveiling a new substantially unexposed section of film for the exposure of light thereto. Succeeding exposed pixels are positioned in a slightly overlapping fashion to cause a double exposure border between pixels, thereby minimizing transparent borders around the respective pixels to thereby minimize "white flash" during the subsequent display. The resulting transparency may be used in conjunction with a display apparatus to sequentially display the individual discrete images.

Other objects and features of the invention will become apparent from consideration of the following description taken in connection with the accompanying drawings.

BRIEF DESCRIPTION OF THE DRAWINGS

FIG. 11 is a block diagram illustrating the method for fabricating the mosaic transparency shown in FIG. 1.

DETAILED DESCRIPTION OF A PREFERRED EMBODIMENT

Figure 1:
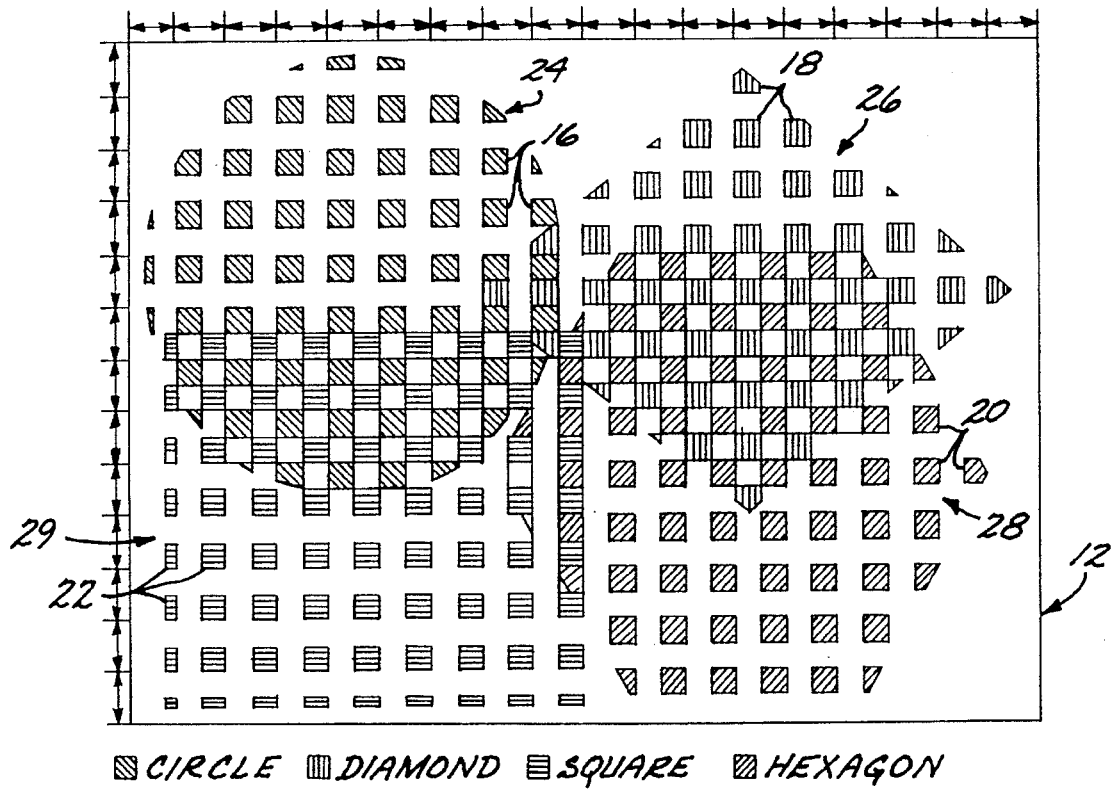
FIG. 1 is a top plan view of a mosaic transparency fabricated by the method of the present invention.

As shown in the drawings for purposes of illustration, display image mosaics 12 (FIG. 1) generally take the form of film negatives exposed in a manner such that four independent patterns exist on each negative. Tiny pixels 14 (FIG. 2) make up each pattern and are uniformly interspersed across the surface of the negative. Individual pixels from each of the four patterns lie adjacent to each other in sequential relative location to form groups of the pixels 15. The groups are arranged such that when an aligned mask obscures pixels of three of the four pixels of a group, pixels of the remaining fourth image are displayed. A slight movement of the mask will expose pixels from a previously hidden image while blocking the pixels of the three remaining images from view.

Referring to FIG. 1, mosaic transparencies include an interlaced pattern of groups of pixels 16, 18, 20 and 22 which, for example, cooperate together in defining discrete designs of a circle, diamond, hexagon, and square, generally designated 24, 26, 28 and 29, respectively. Taking advantage of diverging light radiating outwardly through apertures, the figures will be perceived individually as discrete, continuous shapes. This stems from the fact that light from a source located closely behind the screen defining such apertures radiates in a divergent fashion through the apertures thus projecting divergently toward the viewer and tending to obscure the lines formed between such apertures.

Fabrication systems employed to create similarly formed pictures have often comprised "step and repeat" types of devices which are typically capable of creating only multiple duplicate images on a single piece of film. A previously disclosed mosaic fabrication system includes a mirrored light pathway formed into an exposure framework. A mask is provided to allow only part of the light to expose a sheet of film positioned underneath. The system further includes a fixture having a moveable mount capable of repositioning a sheet of film mounted thereon such that different interspersed sections of the film can be separately exposed, enabling fabrication of the mosaic described above.

Figure 3:
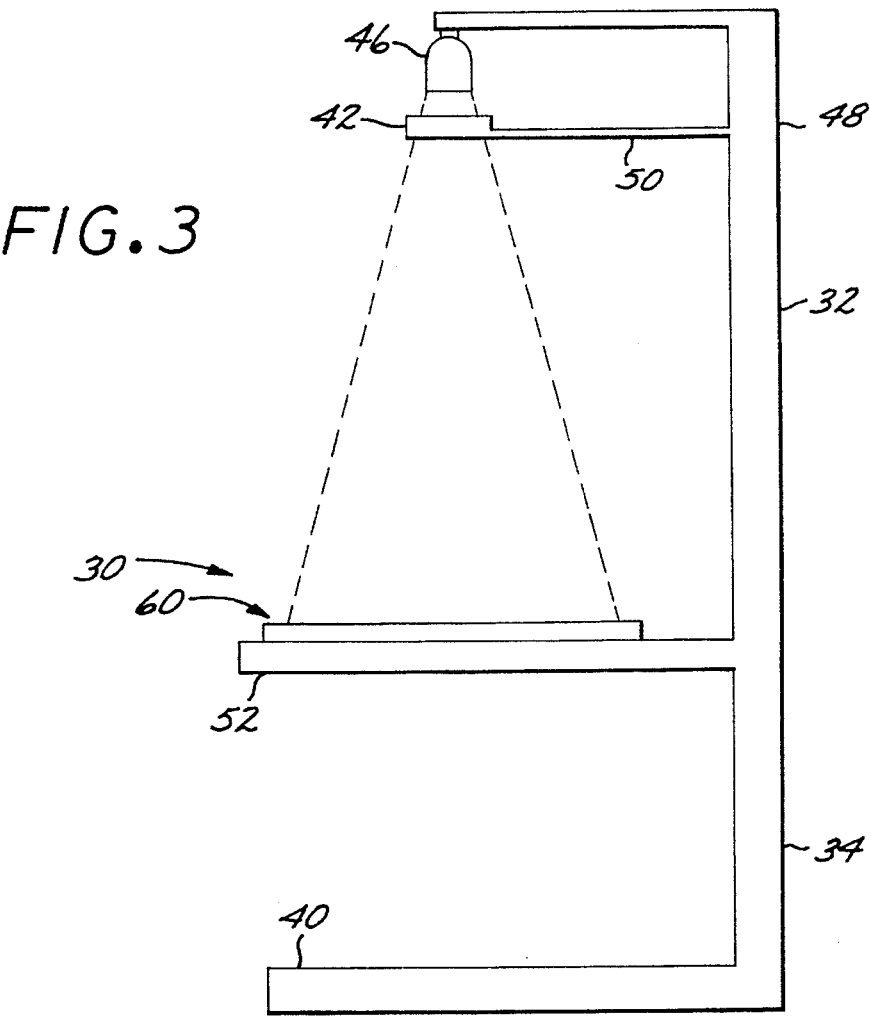
FIG. 3 is a side elevational view in reduced scale of an exposure device for exposing a negative to be employed in the method of the present invention to produce the mosaic shown in FIG. 1.

With reference to FIG. 3, the mosaic transparency fixture of the present invention is employed for use in a standard photograph enlarger system, generally designated 30, which includes an enlarger rack 32 having a negative holder 42 interposed between an elevated light source 46 and a horizontal enlarger table 52. Supporting the entire system is an upstanding vertical post 34 mounted upon a horizontal base 40. The negative holder extends outwardly from the vertical post such that when the light is activated, the resulting beam projects downward onto the enlarger table, substantially parallel to the vertical post in a columnated fashion.

Figures 4, 5:
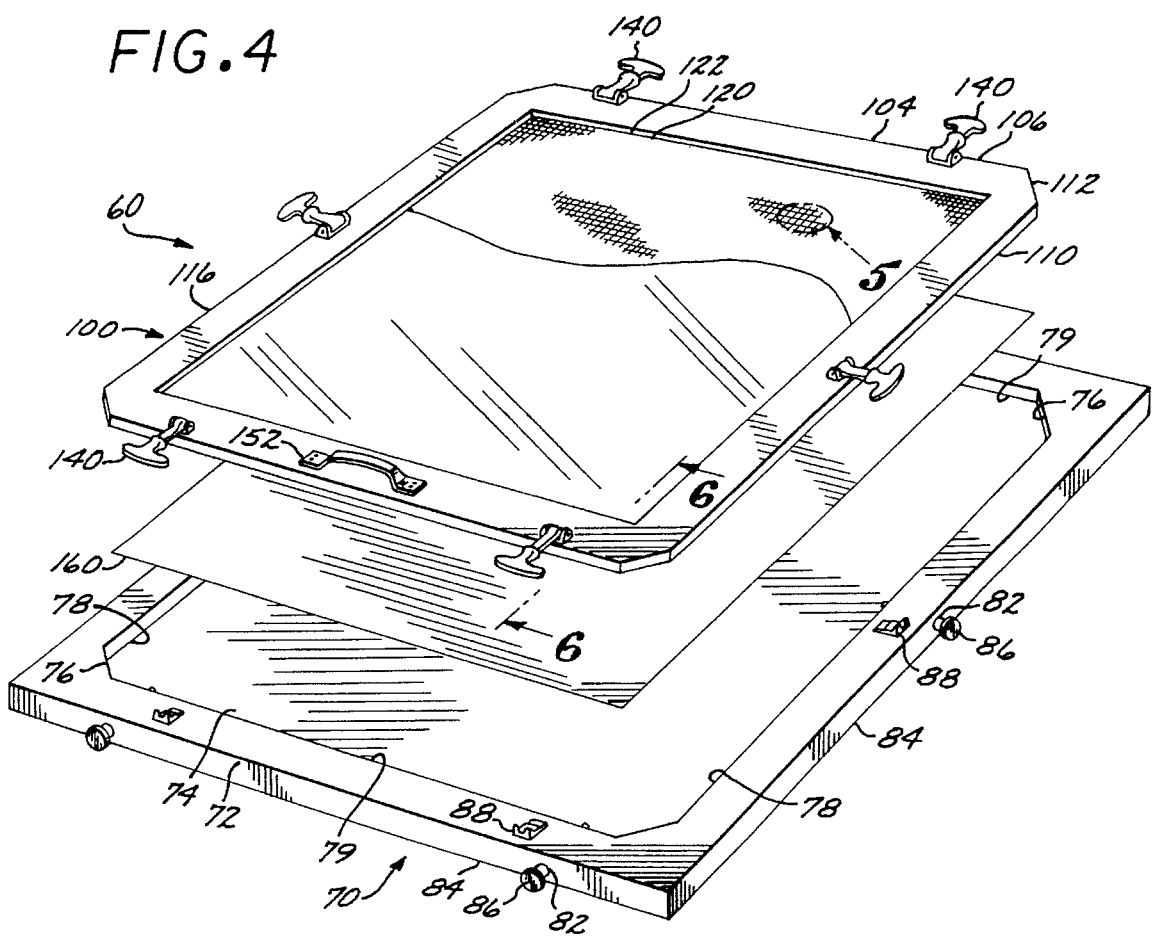
FIG. 4 is an exploded perspective view, in enlarged scale, of a mosaic fixture employed in the method for producing the transparency shown in FIG. 1.
FIG. 5 is a magnified top view of detail 6 of FIG. 4.

Referring to FIGS. 4 and 5, supported horizontally upon the enlarger table 52 is the mosaic transparency fixture of the present invention, generally designated 60, including generally, a base in the form of an outer raised rectangular frame 70 having a central recess 74, and a movable inner border defining a platen frame 100 having an exposure mask 120 mounted thereon.

With particular reference to FIG. 4, the outer frame 70 is preferably constructed of metal, such as aluminum and is configured with a raised peripheral border 72 surrounding the recessed 74. Such border 72 is configured with a recess about one inch deep to define vertical side and end walls 78 and 79, respectively, joined at the four corners by respective chamfers 76. Finished smooth, the recessed planar surface provides a low friction slide surface.

Figure 6:
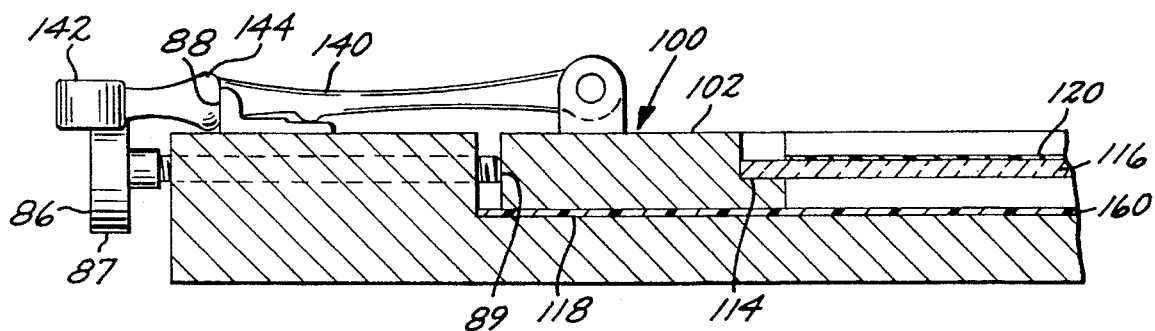
FIG. 6 is a partial cross sectional view, in enlarged scale, taken substantially along line 6—6 of FIG. 4.

The border is formed with a plurality of horizontal threaded through bores 82 extending laterally inwardly through the raised side and end walls 78 and 79, respectively. The through bores lie positioned such that two each are laterally spaced along the top and bottom edges of the outer frame, while a single bore is spaced medially along each side edge. Inwardly received within the through bores are threaded micrometer adjustment screws 86. Such screws are formed with respective threaded shanks (FIG. 6) of sufficient length to project through the raised border walls 78 and 79, mount at their outer ends respective adjustment heads 87 and terminating at their respective inner ends in stops 89 (FIG. 6). Referring further to FIG. 6, mounted medially on each of the side rails 78, and in pairs on the respective top and bottom rails 78, are respective upwardly opening V brackets defining keepers 88.

Referring to FIGS. 4 and 6, the inner platen frame 100 is in the form of a rectangular border 102 defining a central window covered by a glass plate 116 overlayed with a gridlike exposure mask 120. The metallic border 102 is formed on its bottom side with a smooth surface 118 to provide a low friction finish. The outer periphery of the metallic border is undersized relative to the recess 74 of the outer frame 70 and has complementarily shaped side walls 110 and chamfers 112 corresponding to the recessed side walls 78 and chamfers 76 of the outer frame. The inner periphery of the metallic border is formed with a step defining an upwardly facing rectangular shoulder 114 (FIG. 5) for supportive engagement of the marginal edges of a rectangular glass plate 116. The thickness of the inner frame is approximately one inch, corresponding to the depth of the outer frame recess.

Overlaying the glass plate 116 of the inner frame 100 is a gridlike exposure mask 120 for obscuring approximately 75% of the exposure light during an individual exposure. The mask grid (FIG. 5) is formed by a transparent film, generally designated 122, having an interconnected network of horizontal 124 and vertical lines 126 together comprising symmetrically spaced apertures 128 of a square or other desired shape. The apertures serve to expose the square pixels during the exposure process. Constructed from a fiber optically produced, high resolution screening grid, the mask may be commercially obtained from (Bychrome Co., Box 1077, Columbus, Ohio, 43216). To accomplish the blocking of 75% of the exposure light, three of every four apertures in a four aperture cluster are covered with an opaque film. This results in a repetitive gridlike pattern such that for every rectangular cluster 132 of four apertures, the same three (upper left, lower left, lower right) 134 will be opaquely obscured to thus leave only the respective upper right aperture of each quadrant transparent.

With continued reference to FIG. 5, in a preferred embodiment the sides 136 of the apertures 128 defined by the transparent film 122 measure 0.041 inches, which is 0.002 inches larger than the corresponding side of a mosaic pixel. It will be appreciated that the mask apertures are oversized in this manner to minimize the possibility of "white flash" resulting from transparent underexposed borders between pixels. Oversizing of the apertures causes a re-exposure overlap of approximately 0.002 inches along each side of a mosaic pixel. The overlap results in a more pronounced pixel border and minimizes the risk of the "white flash" phenomena occurring during back lighting of the transparency during display image transitions. The 0.002 inch overlap selected for this application has proven sufficient to produce a mosaic which is operative to display images in an attractive manner. For other applications either more or less overlap may be required to produce the desired results. The amount of such overlap necessary for the particular application may be determined by routine experimentation.

Referring to FIGS. 4 and 6, pivotally mounted from respective mounting brackets 139 disposed medially along the respective side rails 78 and in pairs on the respective top and bottom rails are respective rubber T-shaped latch straps 140. Such latches are formed with elongated shanks configured medially with radially bulbous latch elements 144 for releasably engaging the respective keepers 88. In order to fully secure the two frames together during exposure, the straps are positioned such that two each are laterally spaced along the top and bottom rims of the metallic border, while a single strap is spaced medially along each side rim.

Mounted atop the inner frame and spaced medially on the respective upper and lower rims are respective handles 152 and 154 to allow relatively easy repositioning of the inner frame within the outer frame.

In operation a rectangular sheet of unexposed film 160 is placed face up centrally in the recess 74. The inner frame 100 is then opaqued by the handle 152 and placed within the outer frame recess such that the inner frame overlays the film for selective movement thereon. Using the upper right hand corner of the fixture as a reference "zero", the micrometer screws 86 are then adjusted to regulate the movement of the inner frame to 0.039 inches in any one direction. Securing of the inner frame in any one position is accomplished by engaging the appropriate rubber latches 140 of the inner frame to the respective strap latches 88 of the outer frame to hold such inner frame positioned in the selected quadrant of the respective clusters of mosaic pixels to be formed.

A preferred method for creating a mosaic transparency, generally designated 200, involves the use of the exposure system 30 to project discrete images individually down upon the transparency fixture 60 resulting in separate exposures onto a single sheet of film 160. However, by sequentially repositioning the mask bearing inner frame 100 of the fixture through a substantially square path corresponding to the substantially square pixel arrangement prior to each exposure, the resulting fully exposed transparency contains four discrete interlaced images residing on the print.

Figure 7:
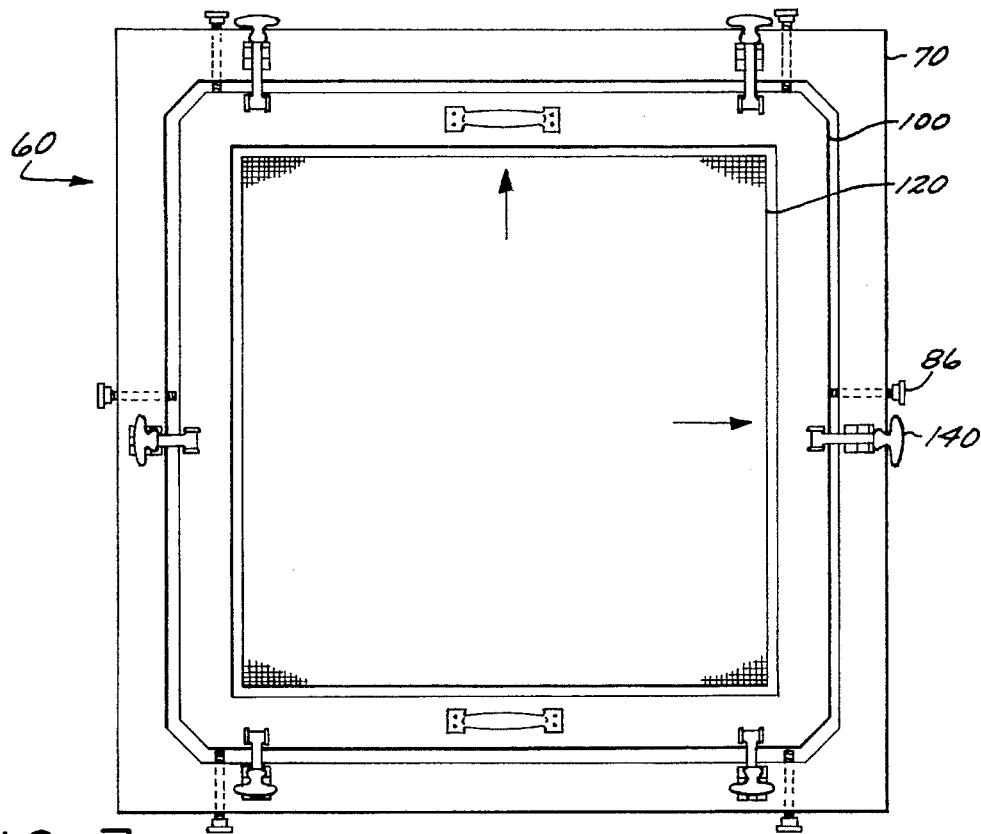
FIGS. 7–10 are top plan views of the fixture shown in FIG. 4, but depicted in different relative positions.

Creating the mosaic transparency begins by providing the enlarger system 202 and individual image bearing negatives 204. Setting up 206 the transparency fixture 60 involves properly securing a sheet of unexposed film 160 face up centrally on the planar surface 74 of the outer frame 70 using tape or an equivalent releasable adhesive to hold it stationary in the recess 74. The inner frame 100 is then placed within the outer frame recess, overlaying the film, and then secured 208 into the upper right hand position of the outer frame recess by the upper and right side latch straps 140 as illustrated in FIG. 7. The first negative is placed in the negative holder and the respective image contained therein projected 210 upon the unexposed film upon activation of the light source.

It will be appreciated that due to the placement of the gridlike mask 120 overlaying the inner frame 100, only approximately 25% of the film 160 will be exposed by the first projected image. This occurs due to the opaque covering over three out of every four apertures formed by the grid network of the mask. Since the only aperture left transparent is the upper right aperture, subsequent repositioning of the mask enables new portions of film to be exposed during subsequent exposure settings.

Figure 8:
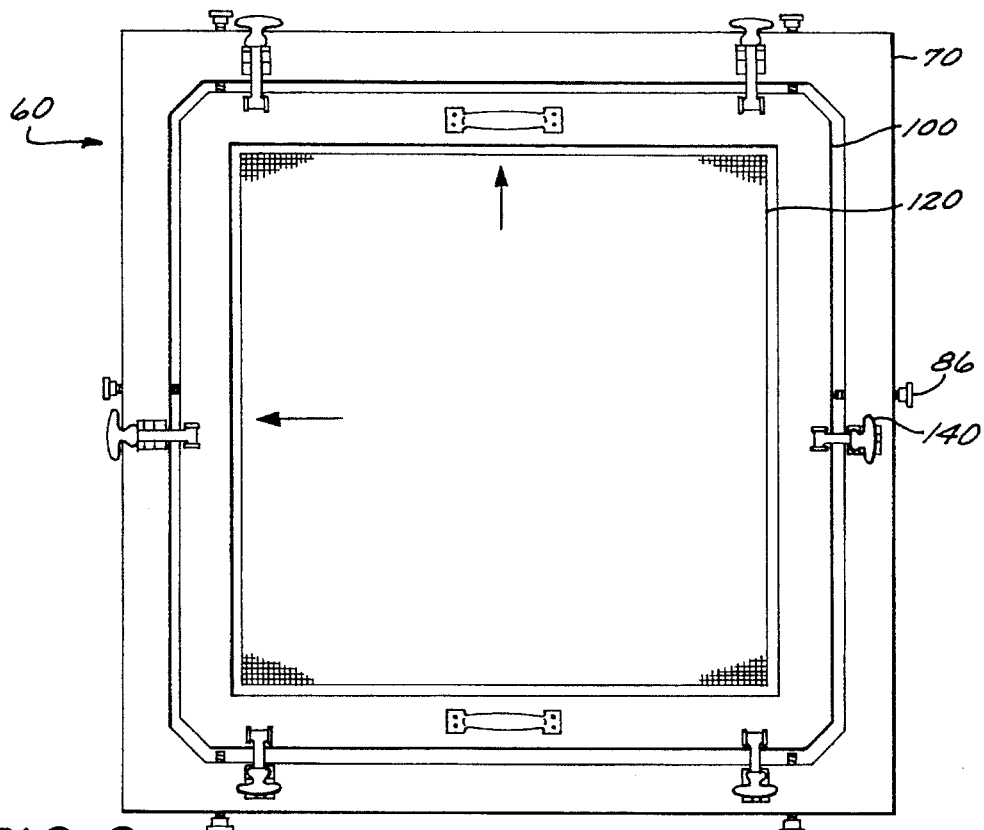

As illustrated in FIG. 8, following the first exposure, the inner frame is unsecured and moved to the left 0.039 inches. It will be appreciated that the micrometer screws act as stops to define predetermined index points and are pre-set to dictate the extent of the desired movement. Once positioned, the upper and left side straps are secured 208, and the second negative placed in the negative holder. As a result of the movement of the inner frame, the transparent aperture of each cluster 132 of the mask 120 moves correspondingly, thus exposing previously obscured film which will correspond to the pixels associated with the particular image being projected. The second image is projected 210 thereon, exposing the revealed film, leaving approximately 50% of the film unexposed.

Figure 9:
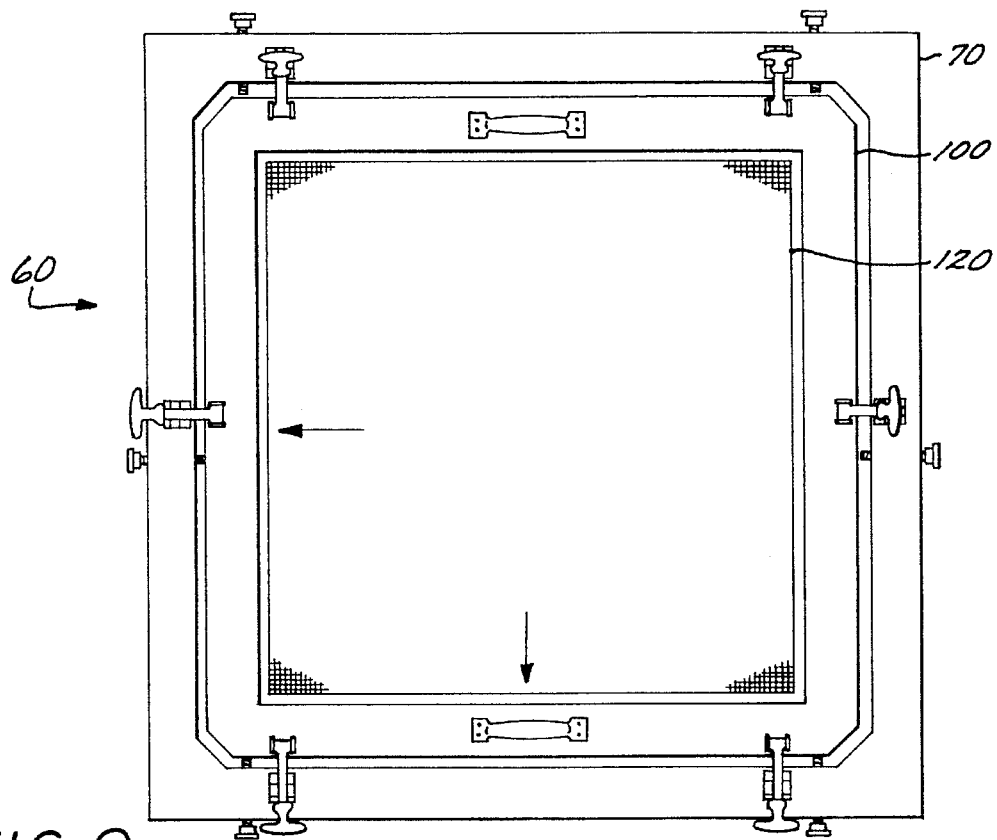
Figure 10:
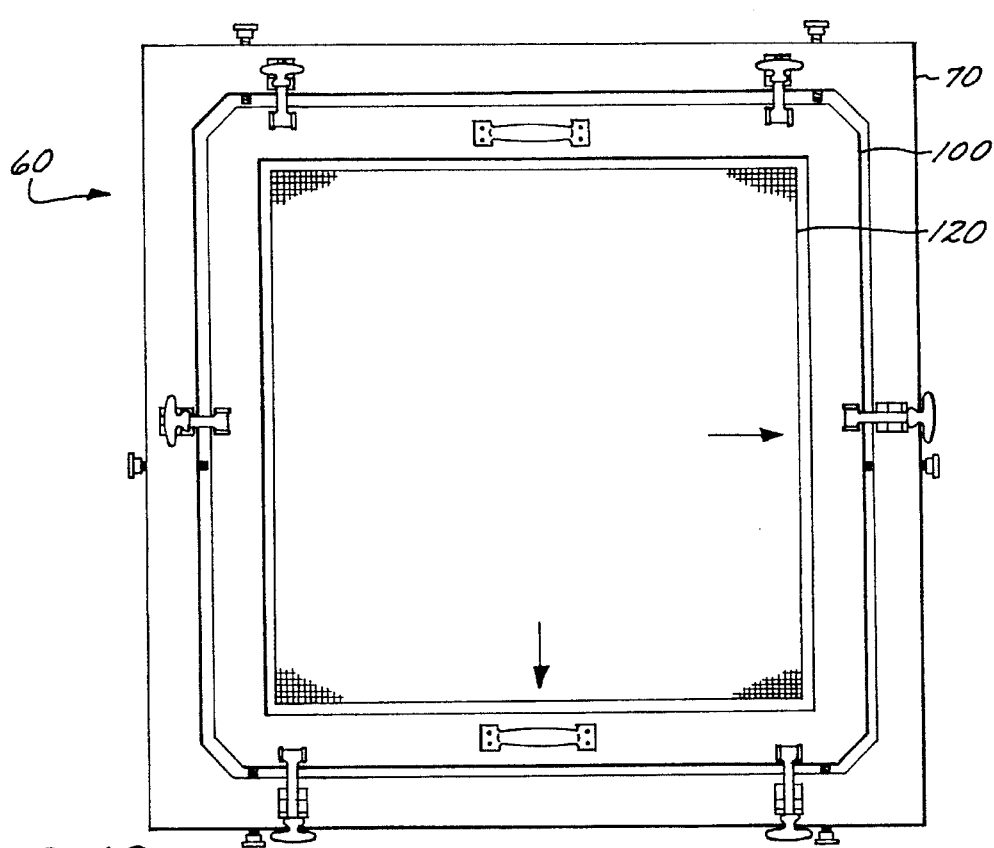

The process is repeated for the third and fourth exposures, with the inner frame repositioned and secured in the lower left portion of the recess for the third exposure (FIG. 9), and in the lower right portion of the recess for the fourth exposure (FIG. 10) thereby completing the substantially square path. Following exposure of the fourth image the film is removed and developed 212 to obtain an image bearing negative comprising four discrete images interlaced with one another over the entire transparency.

Figure 2:
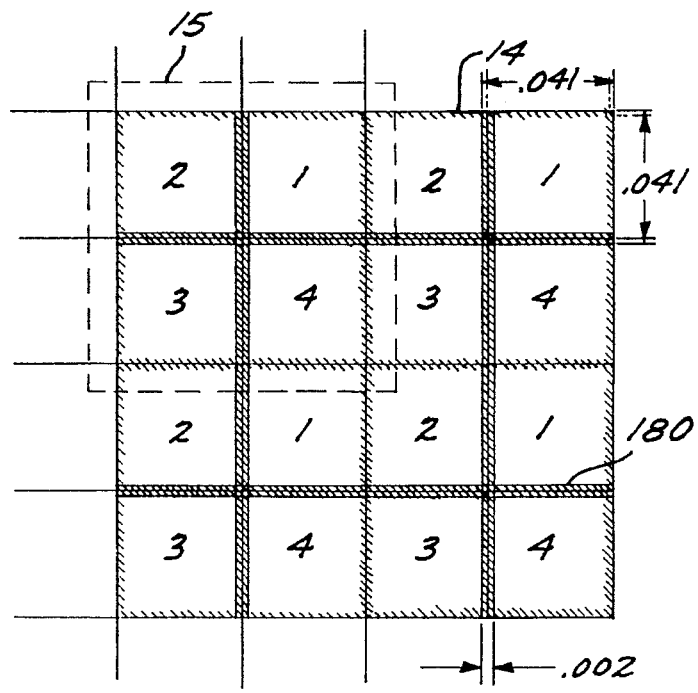
FIG. 2 is a diagrammatic magnified partial view of the mosaic transparency shown in FIG. 1.

With reference to FIG. 2, it will further be appreciated by those skilled in the art that the grid mask aperture sizing will cause newly exposed pixels 14 to slightly overlap onto the adjacent sides of previously exposed pixels thereby resulting in a double exposure along the border 180 therebetween. A preferred method utilizes an exposure mask having apertures sized to 0.041 inches, thus allowing exposure of square pixels having sides measuring 0.041 inches. However, by repositioning the inner frame 100 in increments of only 0.039 inches, a 0.002 inch exposure overlap occurs between each pixel, resulting in a narrowly defined double exposure area surrounding each pixel. This narrow double exposure band between pixel sides defines an opaque border which serves to later block light when the transparency is used with a display device. Previously, the border between pixels was a narrow transparent strip which allowed light to pass during display transitions in the display device. The passing light caused undesirable light "flashing" when moving from picture to picture, commonly known in the industry as "white flash". This novel procedure of overlapping pixel sides during the exposure process virtually guarantees full exposure of the film, thereby eliminating "white flash".

Alternatively, the "white flash" problem may be eliminated by adjusting the distance between the light source and the fixture such that the light projected through the mask apertures diverges outwardly from a central light axis, thus forming slightly oversized pixels which slightly overlap onto the borders of adjacent pixels. Under this alternative approach, sequential repositioning of the platen would be made in increments matching the aperture sizes.

Furthermore, those skilled in the art will appreciate that the vertically upstanding exposure system and controlled movement within the base frame provides an efficient and practical means for fabrication of mosaic transparencies without the need for extraneous mirrors to columnate the light emitted from the light source.

The resulting mosaic transparency may be used with an appropriate display device having the capability of shifting the mosaic through a predetermined sequence relative to a masking screen which serves to block from view approximately 75% of the mosaic. Such devices are functionally similar to the transparency fabrication fixture of the present invention.

These display devices generally include a frame for mounting on a back lighted display box and formed with a mount for mounting such transparency and a second frame for mounting the screen. A drive is provided for selectively driving the transparency frame through a predetermined sequence relative to the screen frame to selectively register the grid apertures simultaneously with the correspondingly located window elements of each group.

While a particular form of the invention has been illustrated and described, it will be apparent to those familiar with the art that various modifications and improvements can be made without department from the scope of the invention as defined by the following claims.

What is claimed is:

1. A mosaic transparency fixture for exposing a single photo sensitive film sheet to produce a transparency formed by a plurality of independent images, each having spaced apart groups of a selected number of predetermined sized pixels interlaced with and spaced from one another along a predetermined polygonal path corresponding with the size of said pixels, said fixture including:

a base formed with a polygonal outer frame raised above a central recess having a planar film support for receipt of a sheet of photographic film;

a platen configured with a peripheral shape to be complementally received in said recess for floating movement within the confines of said outer frame and including a central window; and a light blocking exposure mask mounted on said platen over said window and formed with a pattern corresponding with the location and size of said selected number of predetermined sized pixels, said mask including a transparent aperture in each group of said patterns corresponding with the correspondingly located pixel of each said group, said aperture being formed with sides measuring substantially 0.041 inches.

2. A mosaic transparency fixture for exposing a single photo sensitive film sheet to produce a transparency formed by a plurality of independent images, each having spaced apart groups of a selected number of predetermined sized pixels interlaced with and spaced from one another along a predetermined polygonal path corresponding with the size of said pixels, said fixture including:

a base formed with a polygonal outer frame raised above a central recess having a planar film support for receipt of a sheet of photographic film:

a platen configured with a peripheral shape to be complementally received in said recess for floating movement within the confines of said outer frame and including a central window; and a light blocking exposure mask mounted on said platen over said window and formed with a pattern corresponding with the location and size of said selected number of predetermined sized pixels, said mask including a transparent aperture in each group of said patterns corresponding with the correspondingly located pixel of each said group, said apertures being slightly oversized in relation to said predetermined sized pixels to form double exposed pixel borders between said predetermined sized pixels.

3. A mosaic transparency fixture as recited in claim 2 wherein:

said transparency contains up to four images and said predetermined polygonal path is substantially square.

4. A mosaic transparency fixture as recited in claim 2 wherein:

said mask apertures are slightly oversized in relation to said corresponding pixels by approximately 0.002 inches on each side thereof.

5. A mosaic transparency fixture as recited in claim 2 and further including:

a plurality of precision adjustment devices in spaced relation about said outer frame for immobilization thereof in a predetermined fixed alignment during operation of said fixture for said platen relative to said base to stop the respective said apertures aligned over a corresponding pixel of each said group at each limit of said path.

6. A mosaic transparency fixture as recited in claim 2 including:

a plurality of securing attachments disposed peripherally about said platen and said outer frame for selectively cooperating with said platen and said outer frame for immobilization thereof in a predetermined fixed alignment during operation of said fixture.

7. A mosaic transparency fixture for exposing a photosensitive film sheet to produce a single transparency containing a predetermined number of independent images, each having spaced apart groups of a selected number of predetermined sized pixels interlaced with and spaced from one another along respective legs of a predetermined polygonal path, said legs substantially corresponding with the size of said pixels, said fixture including:

a base including a plate having a flat planar top surface;

an outer polygonal frame mounted in overlying relation onto said base top surface, and including a centrally formed polygonal opening;

a platen formed to be complementally and floatingly received within said polygonal opening, said platen formed with indexing periphery and adapted to be manually shifted through a path from point to point along a platen path corresponding with said predetermined polygonal path and including a central window having a transparent plate mounted therein:

a light blocking exposure mask mounted on said platen over said window and formed with a pattern corresponding with the location and size of said selected number of predetermined sized pixels, said mask including a transparent aperture in each group of said patterns corresponding with the correspondingly located pixel of each said group;

a plurality of stop devices disposed peripherally about said platen and carried from said outer frame for selectively being contacted in pairs by said indexing periphery to cooperate in limiting the extent of movement in the directions along said platen path to selectively stop said platen at the respective said points along said platen path at each respective point to stop the respective said apertures aligned over a corresponding pixel of each said group at each limit of said path.

8. A mosaic transparency fabrication fixture as recited in claim 7 wherein:

said stop devices include a plurality of precision adjustment devices in spaced relation about said outer frame for engaging said platen to limit the extent of movement in the directions along said polygonal path of movement for said platen relative to said base to stop the respective said apertures aligned over a corresponding pixel of each said group at each limit of said path.

9. A mosaic transparency fixture as recited in claim 7 wherein:

said central window includes a transparent glass plate mounted therein; and said mask is photolithographed in overlaying relation on said glass plate.

10. A mosaic transparency fixture as recited in claim 7 wherein:

said apertures in each group of said patterns are slightly oversized in relation to said corresponding pixel.

11. A mosaic transparency fixture for exposing a single photo sensitive film sheet to produce a transparency formed by a plurality of independent images, each having spaced apart groups of a selected number of predetermined sized pixels interlaced with and spaced from one another along legs of a predetermined polygonal path, said legs length in connection with the size of said pixels, said fixture including:

a base formed with a polygonal outer frame raised above a central recess having a planar film support for receipt of a sheet of photographic film to be disposed in fixed position therein;

a light blocking exposure mask mounted on said platen and formed with a pattern corresponding with the location and size of said selected number of predetermined sized pixels, said platen including a transparent aperture in each group of said patterns corresponding with the correspondingly located pixel of each said groups;

a platen formed with a peripheral edge to be floatably and complementally received in said recess for floating movement within the confines of said outer frame to be manually shifted about and including a central window under said mask; and, a plurality of precision stops disposed in spaced relation about said outer frame and positioned to provide for said platen to be manually shifted about to selected positions engaged with at least a pair of said stops to limit the extent of movement in the directions along said legs of said polygonal path of movement for said platen relative to said base to at each selected location stop the respective said apertures aligned over a corresponding pixel of each said group at each limit of said path.

12. A method of making a mosaic transparency of a plurality of independent images, each formed by spaced apart groups of a selected number of predetermined sized pixels interlaced with and spaced from one another to, in each group, form a common pattern with corresponding pixels of each said group correspondingly located and the pixels of each group disposed at selected points along a predetermined pixel path, said method including the steps of:

selecting a photo-sensitive film:

selecting an apparatus having a floating platen overlaying a planar film support and constrained to move relative to said support through a polygonal path having fixed index points corresponding to said predetermined pixel path by a plurality of securing devices disposed peripherally about said planar film support for selectively cooperating with said platen and said outer frame for immobilization thereof along said polygonal path, and an opaque mask overlaying said platen and affixed thereto, said mask having transparent apertures in a predetermined pattern corresponding to said predetermined pixel path:

mounting said film fixedly to said support interposed between said platen and said support;

moving said platen sequentially through said polygonal path to each of said selected index points and stopping said platen sequentially at each respective index point:

selecting a subject to be reproduced at each said index point and projecting exposure light having a light axis substantially orthogonal to said mask from said image, through said apertures in said mask to expose a plurality of corresponding pixels on said film; and removing and developing said exposed film upon completion of said predetermined polygonal path.

13. The method as recited in claim 12 and including the step of:

spacing said exposure light and said apparatus a sufficient distance apart to diverge said exposure light a predetermined angle relative to said light axis wherein said apertures are of a size sufficient to guide and condition said light therethrough such that said pixels exposed onto said film impinge upon the proximate perimeters of adjacent said pixels.

14. The method as recited in claim 12 further including the step of:

selecting said predetermined polygonal path to position said apertures such that adjacent edges of said exposed pixels impinge upon adjacent previously exposed pixels resulting in double exposed pixel borders.

15. The method as recited in claim 14 wherein the step of selecting said predetermined polygonal path includes selecting a path which is substantially square.

16. A method of making a mosaic transparency through use of an apparatus having a floating platen overlaying a planar film support and constrained to move relative to said support through a polygonal path having fixed index points corresponding to said predetermined pixel path by a plurality of positioning and securing devices, and an opaque mask overlaying said platen and affixed thereto, said mask having transparent apertures in a predetermined pattern corresponding to said predetermined pixel path, said method including the steps of:

mounting a sheet of film fixedly to said support in an interposed relationship between said platen and said support; selecting said predetermined polygonal path to position said apertures such that adjacent edges of said exposed pixels impinge upon adjacent previously exposed pixels resulting in double exposed pixel boarders;

moving said platen sequentially through said polygonal path to each of said selected index points and stopping said platen sequentially thereat;

selecting a subject to be reproduced at each said index point and projecting exposure light having a light axis substantially orthogonal to said mask from said image, through said apertures in said mask to expose a plurality of corresponding pixels on said film: and removing and developing said exposed film upon completion of said predetermined polygonal path, wherein the resulting mosaic transparency will be free from transparent unexposed ladders between said pixels to minimize white flash occurrences during point of sale display of such mosaic.

\* \* \* \* \*